July 19, 1938.  R. F. CHRISTMAN  2,124,245
WINDOW LOCK FOR AUTOMOBILES
Filed Oct. 7, 1937
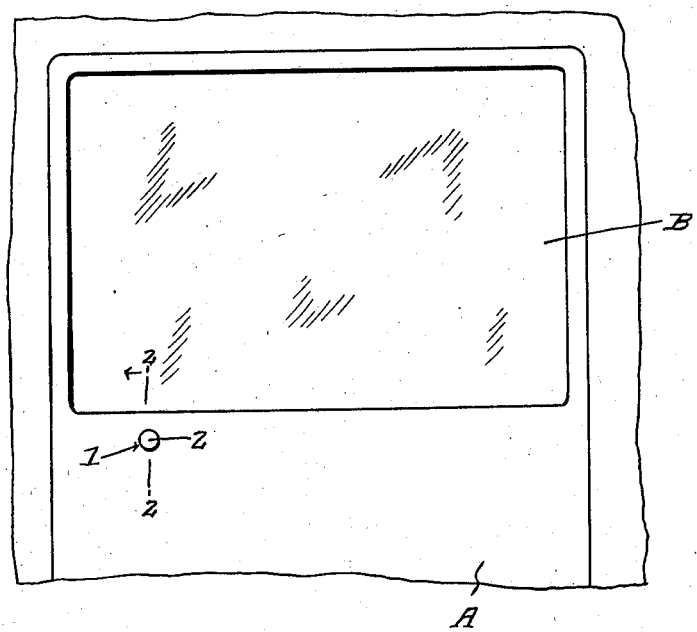
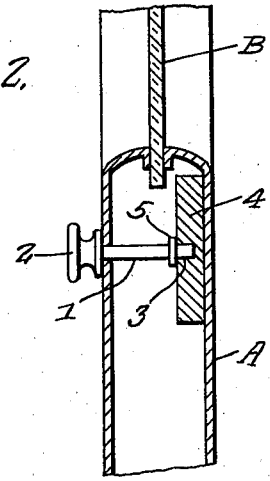
Inventor
Ruth F. Christman,
By Clarence A. O'Brien
Hyman Berman
Attorneys Patented July 19, 1938

2,124,245

UNITED STATES PATENT OFFICE 2,124,245

WINDOW LOCK FOR AUTOMOBILES

Ruth Fulmer Christman, Topeka, Kans.

Application October 7, 1937, Serial No. 167,820

1 Claim. (Cl. 292—145)

This invention relates to window locks for automobiles, the general object of the invention being to provide means manipulated from the inside of the body of an automobile for preventing the glass in a window being lowered from the exterior of the automobile.

This invention also consists in certain other features of construction and in the combination and arrangement of several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a framentary elevation of the interior side of an automobile door having a window therein.

Figure 2 is a sectional view on the line 2—2 of Figure 1.

In this drawing, the letter A indicates a part of an automobile door and the letter B indicates the vertically movable glass member which when in raised position closes the window opening in the door. As is well understood this glass member can, in certain cases, be lowered from the exterior of the automobile by pressing upon the same with the hands and moving the hands downwardly. Of course, after the top of the glass member has been lowered from the upper wall of the opening a sufficient amount to permit the fingers to be engaged with the upper edge of the glass member, then the glass member can be easily moved to lowered position so that the door handle can be manipulated to open the door or articles removed from the vehicle.

It is the object of my invention to provide means for preventing the lowering of this glass member and in carrying out my invention I provide a bolt 1 having a head 2 thereon which is located within the body of the vehicle, the bolt passing through a hole in the inner face of the door slightly below the window opening and the extremity of the bolt engaging a hole 3 formed in a panel 4 which is attached to the inner face of the outer wall of the door frame. A collar 5 is connected with the bolt a slight distance from its end and this collar prevents the bolt from being entirely pulled from the door. As will be seen when the bolt is in operated position it will extend across the path of the glass member so as to prevent this member from being lowered for the member will have its lower edge strike the bolt and thus further movement of the member will be prevented. However, when the bolt is moved to retracted position it will be out of the path of the glass member so that the member can be lowered in the usual manner.

It is thought from the foregoing description that the advantages and novel features of the invention will be readily apparent.

It is to be understood that changes may be made in the construction and in the combination and arrangement of the several parts, provided that such changes fall within the scope of the appended claim.

Having described the invention, what is claimed as new is:—

Means for preventing the lowering of a window of an automobile door comprising a panel attached to the inner face of the outer wall of the door slightly under the bottom wall of the window opening and outwardly of the path of movement of the window, said panel having a hole therein, a bolt slidingly passing through the inner wall of the door, a head on the inner end of the bolt, the other end of the bolt engaging the hole in the panel when the bolt is in operative position extending across the path of movement of the window and a collar on the bolt for engaging the inner wall of the door for preventing entire withdrawal of the bolt from the door.

RUTH FULMER CHRISTMAN.